Nov. 8, 1932.  W. M. MEACHAM  1,886,965
SALT WATER BARRIERS FOR CANALS
Filed April 24, 1928  2 Sheets-Sheet 1
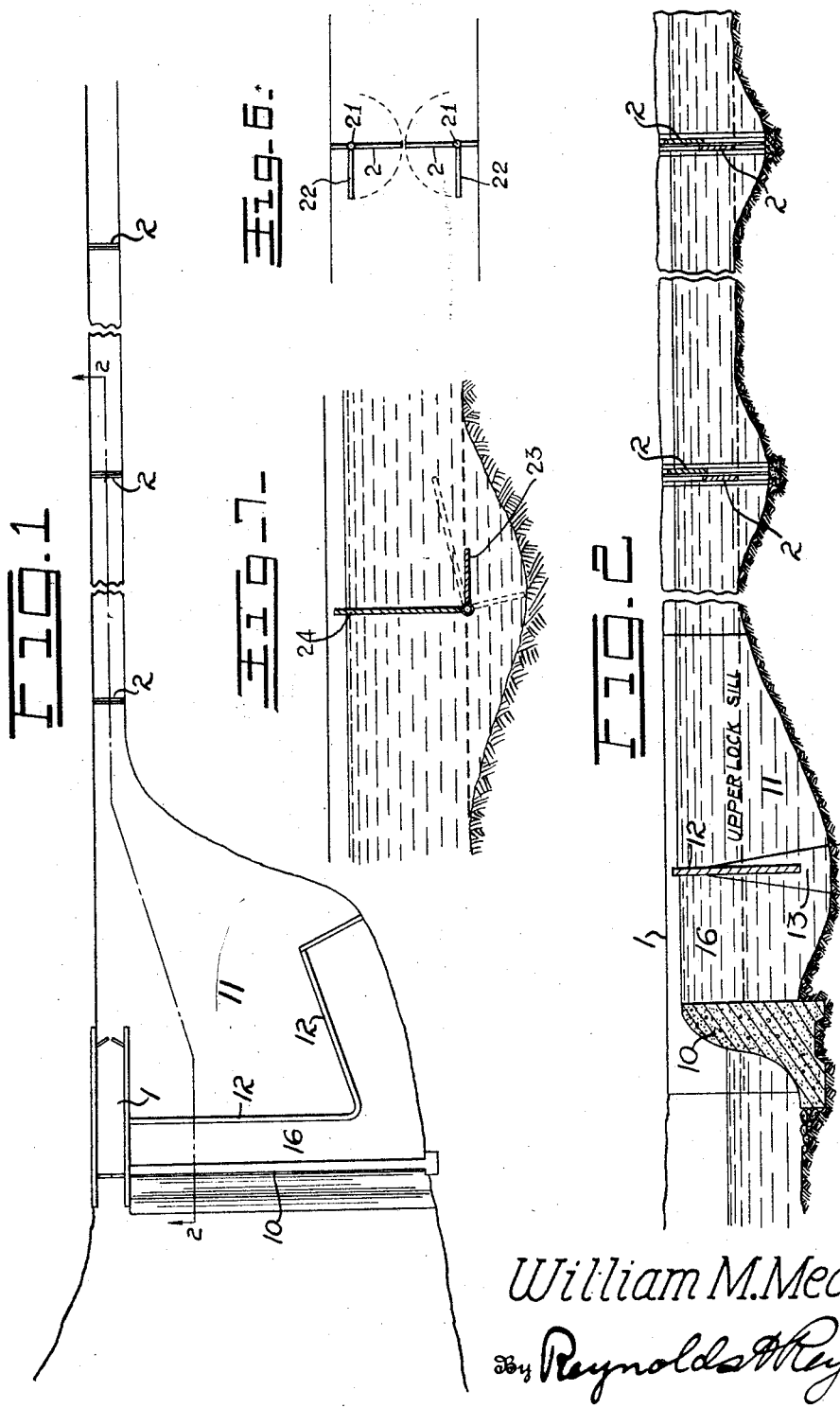
Inventor
William M. Meacham
By Reynolds & Reynolds
Attorneys Nov. 8, 1932.    W. M. MEACHAM    1,886,965
SALT WATER BARRIERS FOR CANALS
Filed April 24, 1928    2 Sheets-Sheet 2
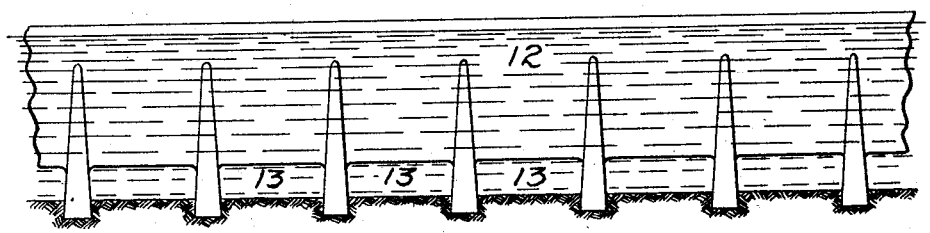
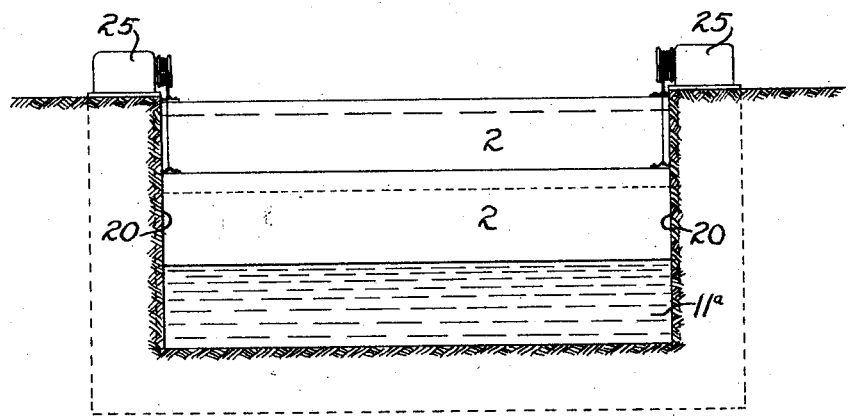
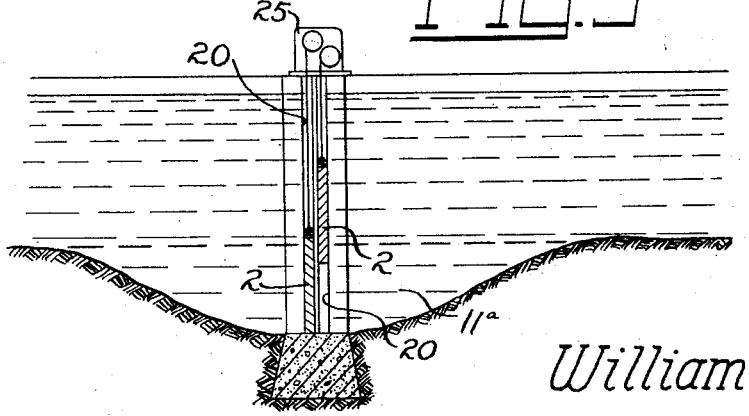
Inventor
William M. Meacham
By Reynolds & Reynolds
Attorneys Patented Nov. 8, 1932

1,886,965

UNITED STATES PATENT OFFICE

WILLIAM M. MEACHAM, OF SEATTLE, WASHINGTON

SALT WATER BARRIERS FOR CANALS

Application filed April 24, 1928. Serial No. 272,467.

My invention pertains to means employed in connection with a lock or locks used to connect salt and fresh water bodies of different levels and having for their object to prevent the salt water working back into the fresh water areas.

The invention lies in the provision of means whereby the salt water which passes the locks is first caught and held in sumps or depressions in the channel and is then drawn from these sumps and discharged with the overflow, said means being so designed and operable as to secure this result with a minimum amount of water.

The invention is based upon the fact that salt water is of higher specific gravity than fresh water and that the salt and fresh waters will stratify with the salt water spreading along the channel bed, displacing and raising the fresh water from the bottom.

In the accompanying drawings, I have shown, in simple constructions, apparatus which may be used to carry out my invention.

Figure 1 shows in plan view a lock and an apparatus for carrying out my invention.

Figure 2 is a vertical section of the same constructions taken on the broken line 2—2 of Figure 1.

Figure 3 is a front elevation of the separating or siphon wall which is placed just above the waste weir.

Figure 4 is a cross sectional elevation of the canal taken adjacent to one of the salt water gates, showing said gate.

Figure 5 is a sectional elevation taken transversely of the same gate.

Figures 6 and 7 are views similar to Figure 5, of gates of somewhat different constructions.

In the operation of locks connecting a fresh water stream or basin with body of salt water, it has been found that the salt water will work upstream, notwithstanding the higher elevation of the body of fresh water. This has been observed at the Panama Canal and also in the canal at Seattle, connecting Puget Sound and Lake Washington. Attention was called to this phenomenon and remedy suggested therefor in U. S. Patent No. 1,173,367, issued to me February 29, 1916. The incomplete and imperfect action of a construction somewhat resembling that disclosed in said patent and located in the Lake Washington Canal has been pointed out in a pamphlet, Bulletin No. 41, recently issued by the engineering experiment station of the University of Washington, located at Seattle. A remedy for this condition suggested by the present applicant is referred to on page 93, et seq., of said pamphlet, which remedy and developments thereof form the subject matter of the present application.

The present invention, as distinguished from that of the said patent, is based upon the use, at the point of drawing off the salt water, of a head corresponding rather closely with that due to difference of specific gravity between the salt and the fresh waters and as a necessary corollary to this, a very slow velocity of flow at the point where the two are separated. It is also, in part, based upon the provision at the gates employed or in any other form of bypass which may be substituted for the sump, of means for closing the flow channels therein whenever the channel gates at these points are opened, and for opening the same when the channel gates are closed, thereby preventing up-stream passage of salt water and effectively using the outflow current to cleanse the sumps and draw off salt water when the channel gates are closed. A sump is considered as a specific form of bypass for the removal of water of greater density.

The present invention differs in operation and results secured from that disclosed in the said patent, in that separation of the salty and fresh water may be secured relying mainly or solely upon difference of specific gravity and with small consumption of fresh water, whenever the available fresh water supply has been reduced to the point where its conservation is a material object, while permitting the use of velocity of flow to thoroughly cleanse the channels whenever sufficient volume of fresh water is available.

The means employed for securing the gravity flow, contemplate the use of what may be termed a selective or segregating discharge outlet located just above the bottom of a sump, which outlet is the sole communication between the upper or fresh water levels and an overflow compartment, said outlet being of large area so that there is a very slow flow of water therethrough.

In the drawings, I have shown several modifications in structure which may be employed to secure the results desired. In Figures 1 and 2 is shown in plan and sectional elevation respectively, a typical construction which employs my invention in direct connection with a lock and an overflow weir. In this 1 represents a lock, 11 a sump adjacent to the lock, 10 an overflow weir and 12, a partition or siphon wall which is interposed between the overflow weir and the main body of the sump. I have shown part of this wall as parallel and close to the upstream face of the overflow weir and part as running at an angle thereto. Its exact position relative to the weir 10 is not material and will vary with differing conditions.

The real essential feature of this wall is that it shall entirely close off the water upstream therefrom from the overflow weir, except through the segregating or selective openings 13, which openings are well below the ruling bottom of the canal channel and which are of very material horizontal extent. The aggregate length of these openings approximates that of the wall.

Any salt water which escapes from the lock into the upper level, will, by reason of its greater specific gravity, settle to the bottom. If the water is drawn, even from the bottom levels, through an outlet of such restricted areas as to produce a material velocity, it draws the water downward thereto as well as horizontally, thus getting a material amount of the overlying fresh water. If, however, the flow openings are large enough horizontally, the velocity of flow will be low and should be lower than that represented by the flow induced by the difference in specific gravity between the salt and the fresh water. In such event, there will be no appreciable tendency to draw the fresh water down from above, but instead the salt water as carried off will be replaced by more distant salt water which will flow to the discharge opening.

It is thus seen that the aggregate horizontal extent of the openings corresponding with the openings 13, has a very material effect in securing the desired result. The water in the space 16 between the screen or wall 12 and the overflow weir 10, will at all times be salty water, so long as there is any salty water in the sump 11. I have indicated greater specific gravity for this body as compared with that above the siphon wall, by showing a difference of surface level. The showing is admittedly an exaggeration of the actual relation existing.

The sump at the lock is preferably made of considerable size. The segregating screen or wall 12 extends to near the bottom and the draw-off openings 13 are of relatively very large area. The waste movement through these openings is, therefore, so slow that there is no tendency to draw down the fresh water. The difference in specific gravity will have time to act to cause the salty water to flow to these discharge openings, as fast as it is drawn off, thereby substantially eliminating the drawing off of fresh water as long as any considerable quantity of salty water remains in the sump.

The same principle is applied to salt water gates, placed in the channel above and distant from the lock. Figs. 4 and 5 show such a gate which employs two leaves 2—2, slidable vertically and held in position by guiding members, as by providing guiding and retaining grooves 20 at the sides of the channel. Raising and lowering means indicated by winches 25, but which may be any suitable means, are provided for raising and lowering the gate leaves. It is intended that one of the leaves 2 shall close or cut off the cross section of the sump 11a when the navigable channel is opened by lowering the gates and that this sump area be unobstructed when the navigable channel is closed by raising of the gates. The sump should also be of a depth to permit lowering all parts of the gate below the ruling depth of the canal. The uppermost leaf need not be lowered to this depth unless the draft of the passing boat requires it.

In the type of construction shown in Figure 6, two gates 2 are pivoted to swing upon vertical axis 21. In this case, the intercepting gate 22 for the sump may be fixed to the same axis, but extending at right angles to the main gate 2.

In the form of device shown in Figure 7, the sump controlling gate 23 is fixed relative to the main gate 24, but at right angles thereto and the pivot is upon the line of intersection of the two parts and horizontal, extending across the canal bottom. The main gate 24 lowers to pass a boat.

Numerous other constructions may be adapted for this use. The desired essential is that when the main gates are partially or wholly opened to pass a boat, the sump section be closed by a gate and when the main gates are closed, the sump section be open. By such means whatever flow occurs when the gate is closed will be through the sump or bypass at bottom levels and the salty water will be drawn out.

A characteristic feature of this invention is that of using the difference of specific gravity to separate the salt and fresh water rather than a velocity of flow to wash the salt water out.

By the term "sump" as herein used is meant any depression or pocket which extends below the ruling established bottom of the channel. That is, any portion of the bottom which lies below adjacent bottom portions to form a pocket into which water of a higher specific gravity would tend to collect.

What I claim as my invention is:

1. A salt water gate for channels which connect salt and fresh water bodies, comprising a sump, movable gate members adapted in one position to close the normal channel section while leaving the sump section open and in another position to close the sump area and open the normal channel area.

2. A salt water barrier for channels which connect salt and fresh water bodies comprising a movable gate adapted in one position to substantially close the channel except for a section along the bottom and in another position to open the aforesaid closed section and to close the aforesaid bottom section.

3. As a means for preventing salt water working up a fresh water channel which discharges into salt water, a sump in said channel, a gate extending across said sump and operable to open and close the channel at this point, and means associated with said gate providing normally open discharge channels located at the level of the sump bottom.

4. As a means for preventing salt water working upward from a lock in a fresh water stream which discharges into salt water, a discharge spillway associated with the lock, a wall extending above the surface to cut off said spillway from the water above the lock, said wall having discharge passages located at about the bottom level of the water on the stream channel above the lock, a sump located in the stream channel above the lock, a gate extending across said sump and normally extending above the surface to close the channel, the gate terminating at its lower edge at about the bottom level of the channel, to leave discharge openings below such level, whereby the discharge may be made to pass through said sump, and means for removing said gate from the channel to permit passage of vessels therepast.

5. A means for preventing salt water working upstream along the bed of a fresh-water channel comprising a surface discharge spillway and a screen wall having flow openings thereunder below the bottom level of the channel, and extending the greater part of the length of the wall, to prevent flow of water to the spillway except through said flow openings.

6. As a means for preventing salt water working upstream from a lock, the combination of a spillway and a screen wall shutting off said spillway from the water above the lock, said screen wall having flow openings extending for a major portion of the length of the wall, and located at practically the bottom level of the body of water above the lock, and of an area which is large relative to the spillway discharge area to thereby insure a slow rate of flow through said flow openings.

7. As a means for preventing salt water working upward from a lock in a fresh water stream which discharges into salt water, a discharge spillway, a wall cutting off said spillway from the water above the lock, said wall having discharge passages located at the bottom level of the water, and of large area relative to the spillway discharge area, a sump located above the lock, and a gate having its normal bottom level above the bottom of said sump, said gate normally closing the channel to prevent flow of water therepast except through the sump.

8. As a means for preventing salt water working upward in a fresh water channel, a discharge spillway, a sump located above said spillway, and a wall cutting off said spillway from the water above the spillway, said wall having discharge passages extending lengthwise thereunder below the bottom level of the channel, and of sufficient area relative to the spillway discharge area to thereby insure a slow rate of flow through said flow openings.

Signed at Seattle, Washington, this 18th day of April, 1928.

WILLIAM M. MEACHAM.